(12) United States Patent
Onodera

(10) Patent No.: US 11,351,937 B2
(45) Date of Patent: Jun. 7, 2022

(54) PROTECTOR AND ROUTING UNIT

(71) Applicant: SUMITOMO WIRING SYSTEMS, LTD., Mie (JP)

(72) Inventor: Kota Onodera, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 17/070,429

(22) Filed: Oct. 14, 2020

(65) Prior Publication Data

US 2021/0122307 A1 Apr. 29, 2021

(30) Foreign Application Priority Data

Oct. 29, 2019 (JP) .............................. JP2019-196263

(51) Int. Cl.
| | | |
|---|---|---|
| B60R 16/02 | (2006.01) | |
| H01B 7/00 | (2006.01) | |
| H02G 3/04 | (2006.01) | |

(52) U.S. Cl.
CPC ....... B60R 16/0215 (2013.01); H01B 7/0045 (2013.01); H02G 3/0468 (2013.01)

(58) Field of Classification Search
CPC .......................... B60R 16/0215; H02G 3/0406
USPC ........................................................ 174/95
See application file for complete search history.

(56) References Cited

U.S. PATENT DOCUMENTS

| | | | | |
|---|---|---|---|---|
| 7,038,133 | B2 * | 5/2006 | Arai ..................... | H02G 3/0418 174/99 R |
| 7,964,796 | B2 * | 6/2011 | Suzuki ................. | H02G 3/0437 174/72 A |
| 8,575,487 | B2 * | 11/2013 | Agusa ................. | B60R 16/0215 174/72 A |
| 9,481,327 | B2 * | 11/2016 | Shibata ............... | B60R 16/0215 |
| 10,482,189 | B2 * | 11/2019 | Nakamura ............. | G06F 30/15 |
| 10,873,187 | B2 * | 12/2020 | Rafsanjan ............... | H02M 1/12 |
| 2006/0219423 | A1 * | 10/2006 | Suzuki ................ | B60R 16/0215 174/72 A |
| 2013/0146354 | A1 * | 6/2013 | Shimada ................ | H01B 17/38 174/72 A |
| 2019/0375347 | A1 * | 12/2019 | Kotani ................. | H02G 3/0481 |

FOREIGN PATENT DOCUMENTS

JP     2018-074837 A     5/2018

* cited by examiner

*Primary Examiner* — Timothy J Thompson
*Assistant Examiner* — Michael F McAllister
(74) *Attorney, Agent, or Firm* — Abelman, Frayne & Schwab

(57) ABSTRACT

A protector includes a protector main portion configured to accommodate a wire harness 100, and a second intermediate guiding portion configured to guide, to the outside, at least part of the wire harness 100 accommodated in the protector main portion. In the protector main portion, an outer face 23a of a side wall portion 23 of the protector main portion includes a fastener base 40 on which the wire harness 100 guided from the second intermediate guiding portion can be fastened with a cable tie B. The fastener base 40 has a placement face 41 on which the wire harness 100 is placed, the placement face being a flat face.

9 Claims, 5 Drawing Sheets

PROTECTOR AND ROUTING UNIT

CROSS-REFERENCE TO RELATED APPLICATIONS

This application is based on and claims priority from Japanese Patent Application No. 2019-196263, filed on Oct. 29, 2019, with the Japan Patent Office, the disclosure of which is incorporated herein in their entireties by reference.

TECHNICAL FIELD

The present disclosure relates to a protector and a routing unit.

BACKGROUND

Conventionally, there are techniques in which electric wires routed in vehicles such as automobiles are accommodated in protectors so that the electric wires are protected and the routes of the electric wires are regulated (See, for example, Japanese Patent Laid-Open Publication No. 2018-074837). The protector includes a semi-tubular accommodating portion that has an opening defined by a bottom wall portion and side wall portions provided on the bottom wall portion, and a cover portion that covers the opening of the accommodating portion, and is formed substantially in the tubular shape. According to the protector of Japanese Patent Laid-Open Publication No. 2018-074837, for example, an outer face of the protector is provided with a fastener base on which a wire harness can be fastened by a fastener.

SUMMARY

Incidentally, this sort of protector is provided with a fastener base on which a wire harness can be fastened by a fastener, for example, but a placement face on which the wire harness is to be placed has a curved face that is curved along the outer circumferential face of the harness. Accordingly, the size of the fastener base may increase.

It is an object of the present disclosure to provide a protector and a routing unit that can reduce the size of a fastener base for fastening a wire harness.

The present disclosure is directed to a protector including: a protector main portion configured to accommodate a wire harness; and a guiding portion configured to guide, to an outside, at least part of the wire harness accommodated in the protector main portion, wherein, in the accommodating portion, an outer face of a wall portion of the protector main portion includes a fastener base on which the wire harness guided from the guiding portion can be fastened by a fastener, and the fastener base has a placement face on which the wire harness is placed, the placement face being a flat face.

The present disclosure is further directed to a routing unit including: a vibrating portion; a wire harness configured to be connected to the vibrating portion; and a protector that accommodates the wire harness, wherein the protector includes a protector main portion that accommodates the wire harness, and a guiding portion that guides, to an outside, at least part of the wire harness accommodated in the protector main portion, in the accommodating portion, an outer face of a wall portion of the protector main portion includes a fastener base on which the wire harness guided from the guiding portion can be fastened by a fastener, and the fastener base has a placement face on which the wire harness is placed, the placement face being a flat face.

According to the protector and the routing unit of the present disclosure, it is possible to reduce the size of a fastener base for fastening a wire harness.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
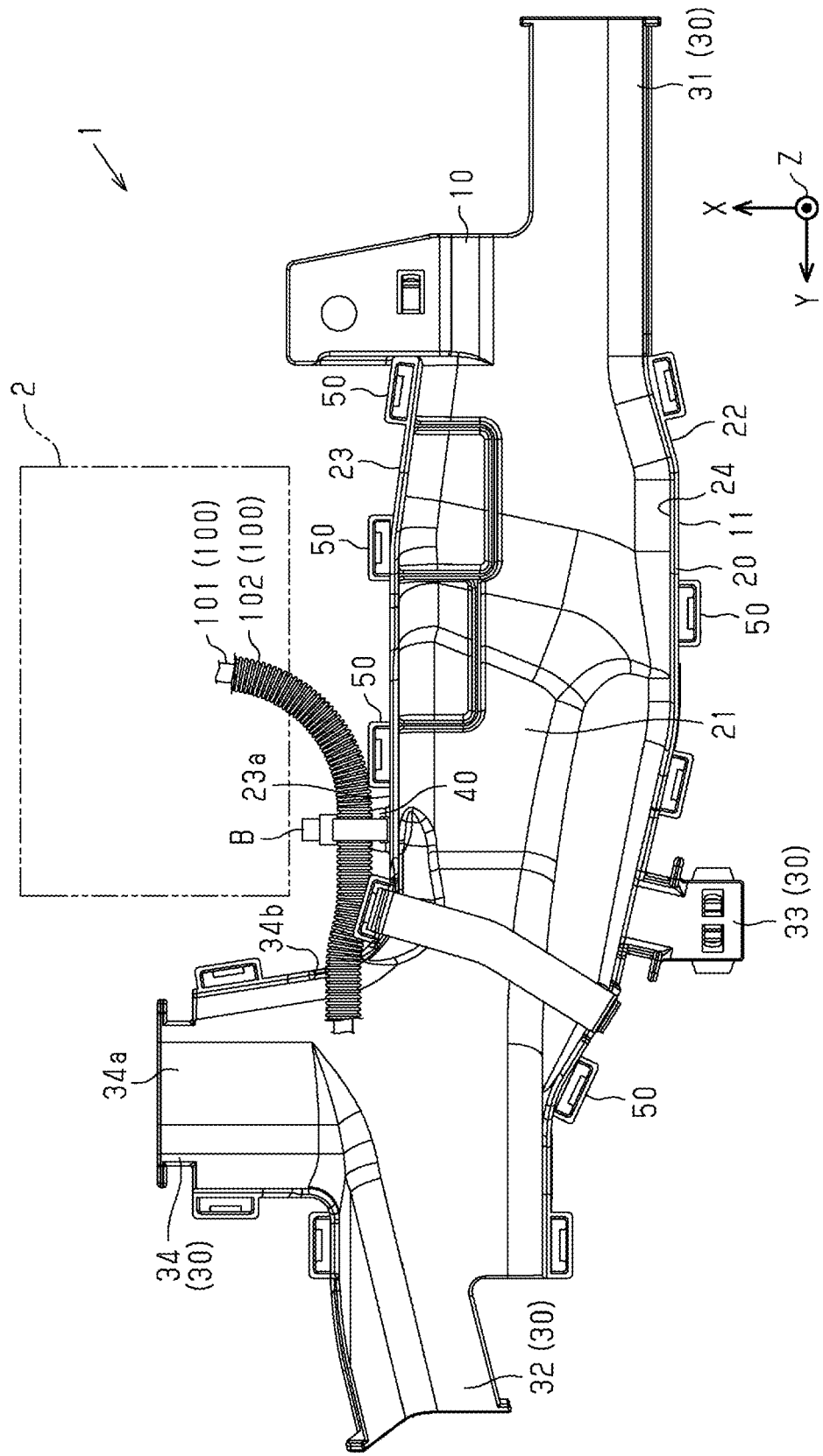
FIG. 1 is a plan view showing the structure around a protector and a harness according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

[1] The present disclosure is directed to a protector including: a protector main portion configured to accommodate a wire harness; and a guiding portion configured to guide, to an outside, at least part of the wire harness accommodated in the protector main portion, wherein, in the protector main portion, an outer face of a wall portion of the protector main portion includes a fastener base on which the wire harness guided from the guiding portion can be fastened by a fastener, and the fastener base has a placement face on which the wire harness is placed, the placement face being a flat face.

With this configuration, since the placement face of the fastener base for a wire harness is a flat face, an unnecessary curved face portion does not have to be provided, and thus it is possible to reduce the size of the fastener base.

[2] It is preferable that the fastener base has a protrusion that is adjacent to the placement face and that projects higher than the placement face.

With this configuration, since the protrusion that projects higher than the placement face is arranged adjacent to the placement face, the protrusion can suppress the displacement of the wire harness in a state in which the wire harness is placed on the placement face.

[3] It is preferable that the protrusion is elongated in a direction that is orthogonal to the projecting direction and that intersects a direction in which the wire harness extends.

With this configuration, the protrusion can regulate displacement in the direction in which the wire harness extends.

[4] It is preferable that the protrusion is arranged on each of the two sides of the placement face in a direction in which the wire harness extends.

With this configuration, the protrusion is arranged on each of the two sides of the placement face in the direction in which the wire harness extends, the number of points at which the protrusion is in contact with the wire harness can be increased, and thus it is possible to more reliably regulate displacement in the direction in which the wire harness extends.

[5] It is preferable that the wire harness includes an electric wire and an outer member that covers an outer side of the electric wire, and the protrusion is in contact with the outer member.

With this configuration, since the outer member that is arranged on the outer side of the electric wire is in contact with the protrusion, it is possible to regulate the displacement of the outer member.

[6] It is preferable that the outer member is an accordion-like corrugated tube that covers the outer side of the electric wire and that has a groove and a ridge, and the protrusion is fitted to and is in contact with the groove of the corrugated tube.

With this configuration, since the protrusion is fitted to the groove of the corrugated tube, it is possible to more reliably regulate the displacement of the corrugated tube.

[7] It is preferable that the protector main portion includes an opening through which the wire harness is accommodated, and further includes a lock portion that fastens a cover portion to the protector main portion, the cover portion being configured to close the opening in a state in which the wire harness is accommodated, and the fastener base is arranged at a position that is away from the lock portion.

With this configuration, since the fastener base is arranged at a position that is away from the lock portion, it is possible to suppress contact of the wire harness and the fastener arranged on the fastener base with the lock portion.

[8] The present disclosure is further directed to a routing unit including: a wire harness configured to be connected to a vibrating portion; and a protector that accommodates the wire harness, wherein the protector includes a protector main portion that accommodates the wire harness, and a guiding portion that guides, to an outside, at least part of the wire harness accommodated in the protector main portion, in the protector main portion, an outer face of a wall portion of the protector main portion includes a fastener base on which the wire harness guided from the guiding portion can be fastened by a fastener, and the fastener base has a placement face on which the wire harness is placed, the placement face being a flat face.

With this configuration, since the placement face of the fastener base for a wire harness is a flat face, an unnecessary curved face portion does not have to be provided, and thus it is possible to reduce the size of the fastener base.

Details of Embodiments of the Present Disclosure

Hereinafter, specific examples of the routing unit according to the present disclosure will be described with reference to the drawings. In the drawings, parts of configurations are shown exaggerated or simplified in some cases for convenience of description. Also, dimensional proportions of the portions may be different between the drawings. Being "parallel" or "orthogonal" as used herein includes not only being exactly parallel or orthogonal, but also being substantially parallel or orthogonal, as long as the operations and effects of the present embodiment can be achieved. It should be noted that the present invention is not limited to these examples, and is intended to include all modifications which fall within the scope of the claims and the meaning and scope of equivalents thereof.

As shown in FIG. 1, a routing unit 1 includes a vibrating portion 2, a wire harness 100 at least part of which is connected to the vibrating portion 2, and a protector 10 that accommodates the wire harness 100.

The vibrating portion 2 is mounted in a vehicle, and vibrates or swings. Examples of the vibrating portion 2 include a motor for EPS (electric power steering).

(Configuration of Protector 10)

Figure 2:
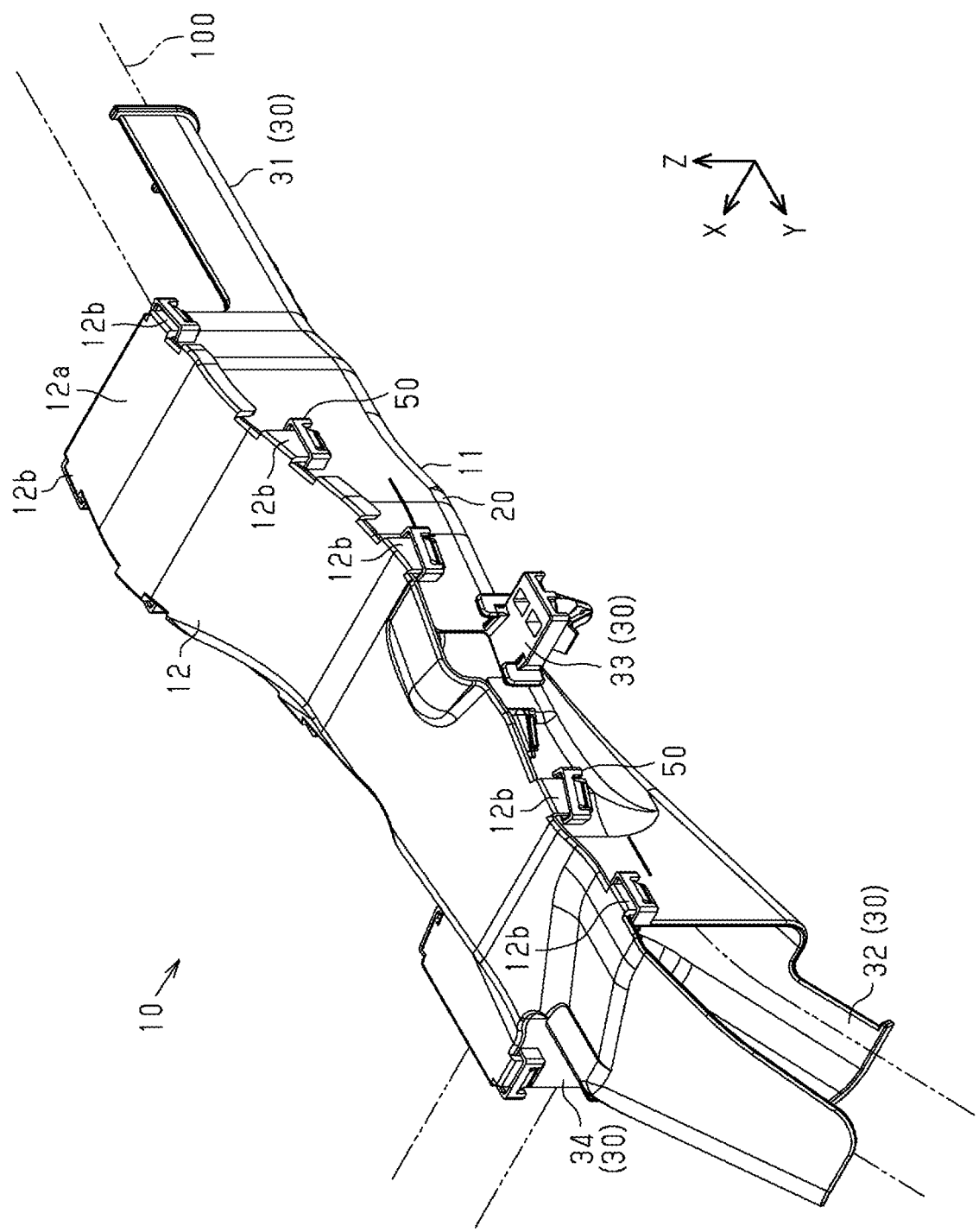
FIG. 2 is a perspective view of the protector according to the embodiment.

As shown in FIG. 2, the protector 10 includes a protector main portion 11 and a cover portion 12. The protector main portion 11 and the cover portion 12 are both resin molded articles. Furthermore, the protector main portion 11 and the cover portion 12 are separately molded articles. The protector 10 is attached to a vehicle. In the description below, the width direction of the protector main portion 11 is referred to as a width direction X, and the length direction of the protector main portion 11 is referred to as a length direction Y. Furthermore, a direction that is orthogonal to both of the width direction X and the length direction Y is referred to as a height direction Z. Note that the height direction Z is a direction that is parallel to the vertical direction in a state in which the protector 10 is attached to a vehicle, and the direction indicated by the arrow Z in FIG. 2 is indicated as the upper direction.

(Configuration of Protector Main Portion 11)

Figure 3:
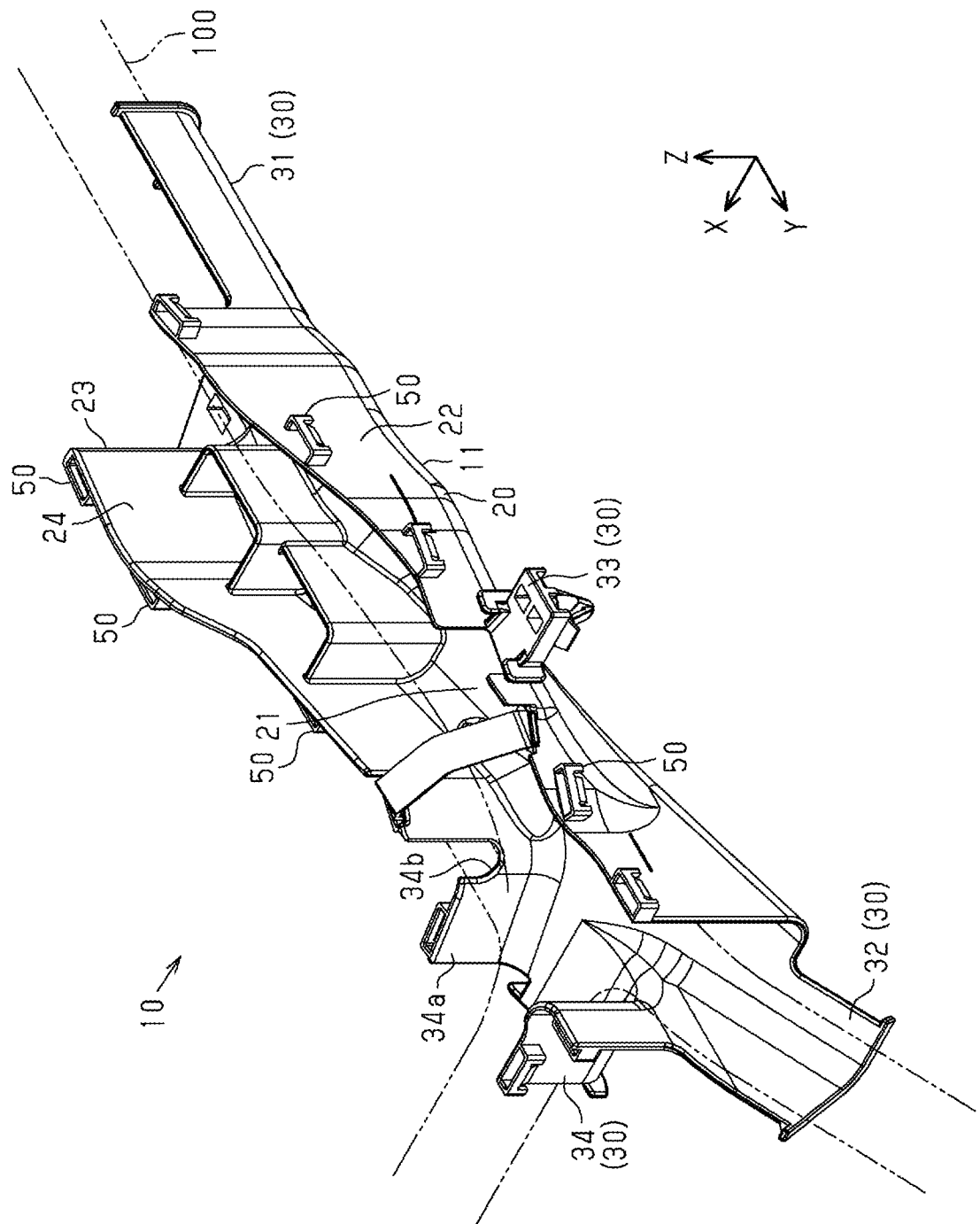
FIG. 3 is a perspective view showing a state in which a cover portion of the protector according to the embodiment is detached.

As shown in FIG. 3, the protector main portion 11 includes an accommodating portion 20 that accommodates a wire harness 100, and a plurality of guiding portions 30.

(Configuration of Accommodating Portion 20)

As shown in FIG. 3, the accommodating portion 20 includes a bottom wall portion 21, a pair of side wall portions 22 and 23 that extend from the bottom wall portion 21, and an opening 24 that is open in a direction opposing to the bottom wall portion 21. The accommodating portion 20 is formed in the semi-tubular shape defined by the bottom wall portion 21 and the pair of side wall portions 22 and 23.

As shown in FIG. 3, the pair of side wall portions 22 and 23 include a side wall portion 22 arranged along a side edge on one side in the width direction X of the bottom wall portion 21, and a side wall portion 23 arranged along a side edge on the other side in the width direction X of the bottom wall portion 21. The pair of side wall portions 22 and 23 are formed so as to extend upward in the height direction Z from the bottom wall portion 21.

(Configuration of Guiding Portions 30)

As shown in FIG. 3, the guiding portions 30 include an end guiding portion 31 arranged at an end on one side in the length direction Y that is a direction in which the accommodating portion 20 extends, and an end guiding portion 32 arranged at an end on the other side in the length direction Y that is a direction in which the accommodating portion 20 extends. Furthermore, the guiding portions 30 include an intermediate guiding portion 33 arranged at the side wall portion 22 of the accommodating portion 20, and an intermediate guiding portion 34 arranged at the side wall portion 23 of the accommodating portion 20. The guiding portions 31, 32, 33, and 34 are held together with the wire harness 100 with a wind tape or a cable tie, thereby regulating the direction for guiding the electric wires.

As shown in FIG. 1, the intermediate guiding portion 34 includes a first intermediate guiding portion 34a that guides the wire harness 100 in the width direction X, and a second intermediate guiding portion 34b that guides the wire harness 100 in the length direction Y from a certain position in the first intermediate guiding portion 34a. The second intermediate guiding portion 34b is open along the side wall portion 23, of the pair of side wall portions 22 and 23.

Figure 5:
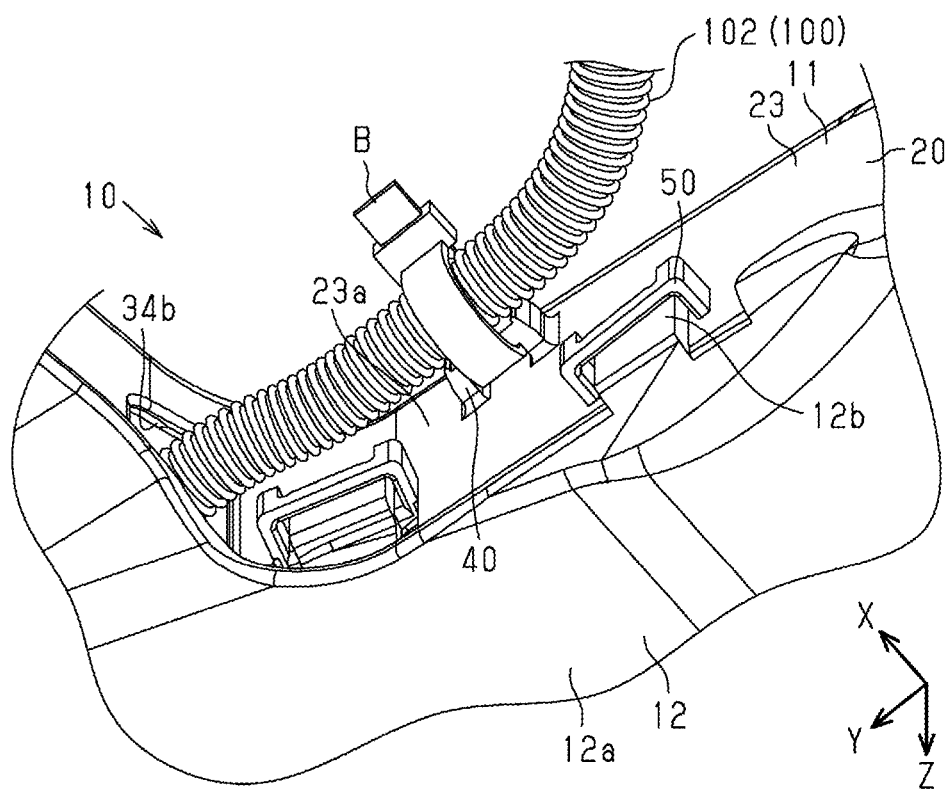
FIG. 5 is a perspective view showing the fastener base, a wire harness, and a fastener according to the embodiment.
Figure 6:
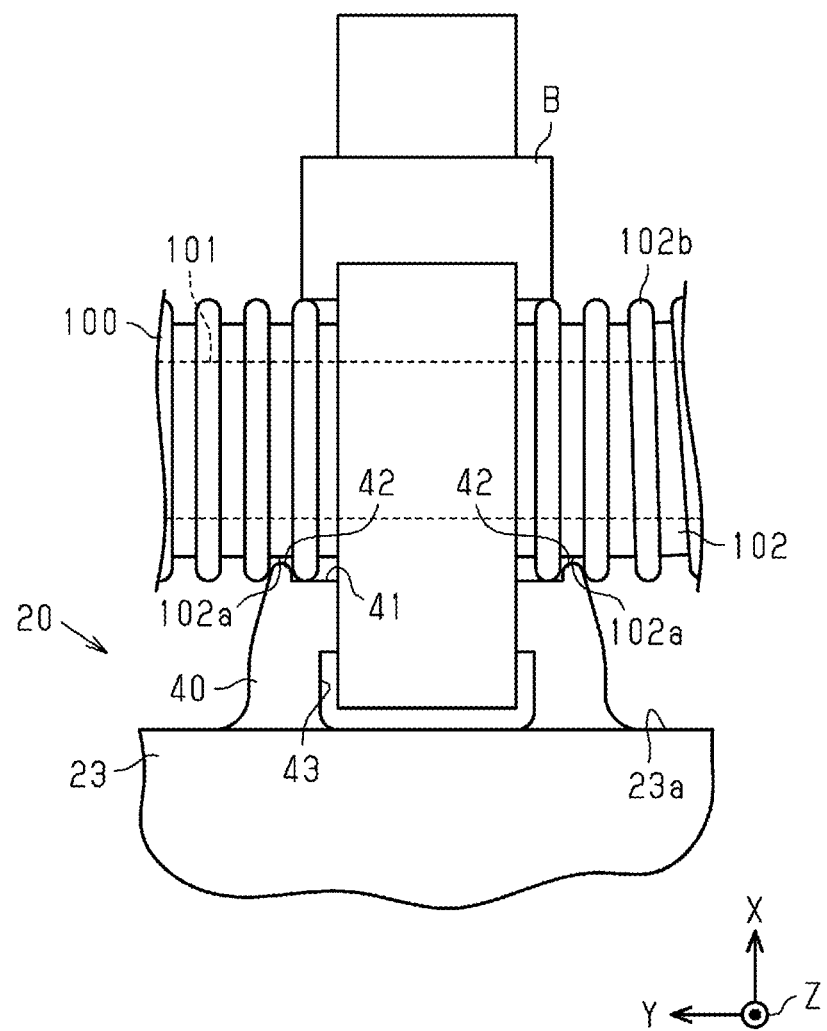
FIG. 6 is an enlarged view showing the structure around the fastener base according to the embodiment.

As shown in FIGS. 5 and 6, the wire harness 100 that is guided from the second intermediate guiding portion 34b includes an electric wire 101 and a corrugated tube 102, which is an outer member that covers the outer side of the electric wire 101, and is directly or indirectly connected to the vibrating portion 2. The vibrating portion 2 directly or indirectly vibrates. Thus, the wire harness 100 directly or indirectly connected to the vibrating portion 2 and guided from the second intermediate guiding portion 34b is likely to swing. The corrugated tube 102 is formed in the tubular shape with an accordion-like surface defined by grooves 102a and ridges 102b.

As shown in FIGS. 5 and 6, in the accommodating portion 20 constituting the protector main portion 11, an outer face 23a of the side wall portion 23, which is a wall portion of the protector main portion 11, includes a fastener base 40 on which the wire harness 100 guided from the second intermediate guiding portion 34b can be fastened with a cable tie B, which is a fastener.

As shown in FIGS. 5 and 6, the fastener base 40 includes a placement face 41 on which the corrugated tube 102 of the wire harness 100 can be placed, protrusions 42 that are arranged on two sides of the placement face 41 and project higher than the placement face 41, and an insertion hole 43 into which the cable tie B can be inserted.

Figure 4:
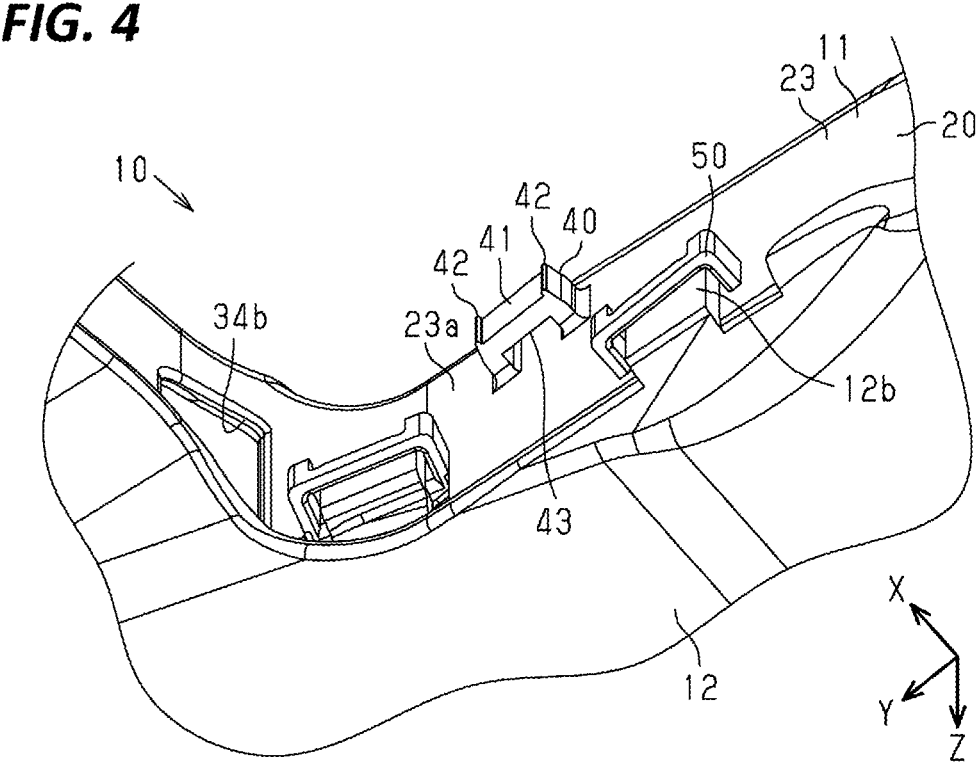
FIG. 4 is a perspective view showing the structure around a fastener base according to the embodiment.

As shown in FIGS. 4 and 6, the placement face 41 is a flat face that is parallel to the length direction.

As shown in FIGS. 4, 5, and 6, the protrusions 42 are formed so as to be elongated in the height direction Z, which is a direction that is orthogonal to the direction in which the protrusions 42 project and that intersects the direction (the length direction Y) in which the wire harness 100 extends on the placement face 41. The two sides in the length direction Y, which is the direction in which the wire harness 100 extends on the placement face 41, are each provided with one protrusion 42, that is, provided with two protrusions 42 in total. The two protrusions 42 are fitted to the grooves 102a of the corrugated tube 102.

(Configuration of Cover Portion 12)

As shown in FIG. 1, the cover portion 12 includes a cover main portion 12a, and a plurality of lock catch portions 12b that are arranged at the two side edges in the width direction X of the cover main portion 12a.

The cover main portion 12a is configured to close the opening 24 of the accommodating portion 20. The lock catch portions 12b engage with lock frame portions 50 that are formed at the pair of side wall portions 22 and 23, so that the opening 24 of the accommodating portion 20 is kept closed by the cover portion 12. Furthermore, the fastener base 40 is arranged at a position that is away from the lock frame portions 50, which are lock portions.

Hereinafter, the actions of this embodiment will be described.

The routing unit 1 of this embodiment is configured such that the protector main portion 11 of the protector 10 accommodates the wire harness 100. The wire harness 100 is guided from each guiding portion 30 of the protector 10 to the outside. The wire harness 100 guided from the second intermediate guiding portion 34b constituting the guiding portions 30 is fastened by the cable tie B to the fastener base 40 that is arranged at the outer face 23a of the side wall portion 23 of the accommodating portion 20 constituting the protector main portion 11. At this time, the placement face 41 of the fastener base 40 on which the wire harness 100 (the corrugated tube 102) is placed is a flat face.

Hereinafter, the effects of this embodiment will be described.

(1) Since the placement face 41 of the fastener base 40 for the wire harness 100 is a flat face, an unnecessary curved face portion does not have to be provided, and thus it is possible to reduce the size of the fastener base 40.

(2) Since the protrusions 42 that project higher than the placement face 41 are arranged adjacent to the placement face 41, the protrusions 42 can suppress the displacement of the wire harness 100 in a state in which the wire harness 100 is placed on the placement face 41.

(3) The protrusions 42 that are elongated in a direction that is orthogonal to the projecting direction and that intersects the direction (the length direction Y) in which the wire harness 100 extends can regulate displacement in the direction in which the wire harness 100 extends.

(4) Since the protrusions 42 are respectively arranged on the two sides of the placement face 41 in the direction (the length direction Y) in which the wire harness 100 extends, the number of points at which the protrusions 42 are in contact with the wire harness 100 can be increased. Thus, it is possible to more reliably regulate the displacement in the direction in which the wire harness 100 extends.

(5) Since the corrugated tube 102, which is an outer member that is arranged on the outer side of the electric wire 101, is in contact with the protrusions 42, it is possible to regulate the displacement of the corrugated tube 102.

(6) Since the protrusions 42 are fitted to and in are contact with the grooves 102a of the corrugated tube 102 constituting the wire harness 100, it is possible to more reliably regulate the displacement of the corrugated tube 102.

(7) Since the fastener base 40 is arranged at a position that is away from the lock frame portions 50, which are lock portions, it is possible to suppress contact of the wire harness 100 and the cable tie B, which is a fastener, arranged on the fastener base 40 with the lock frame portions 50.

Other Embodiments

Note that the above-described embodiment may be modified and implemented as described below. The embodiment described above and changes thereto can be combined and implemented within a scope that that is technically consistent.

In the foregoing embodiment, the corrugated tube 102 was used as an outer member of the electric wire 101, but there is no limitation to this, and it is also possible to use a configuration in which a spiral tube or other types of outer members are used.

Furthermore, it is also possible to use a configuration in which an outer member such as the corrugated tube 102 is omitted. That is to say, the wire harness 100 may be constituted by the electric wire 101. In this case, the electric wire 101 may be one electric wire, or an electric wire bundle obtained by bundling a plurality of electric wires.

In the foregoing embodiment, the protrusions 42 are elongated in the direction that is orthogonal to the projecting direction and that intersects the direction in which the wire harness 100 extends on the placement face 41, but there is no limitation to this. That is to say, it is also possible that the length of the protrusions 42 is freely changed.

In the foregoing embodiment, the configuration was used in which two protrusions 42 are provided, but it is also possible to use a configuration in which one protrusion, or three or more protrusions are provided.

In the foregoing embodiment, the configuration was used in which the protrusions 42 are provided, but it is also possible to use a configuration in which the protrusions 42 are omitted.

In the foregoing embodiment, the configuration was used in which the fastener base 40 is arranged at a position that is away from the lock frame portions 50, but there is no limitation to this, and it is also possible to use a configuration in which the lock frame portions 50 and the fastener base 40 are adjacent to each other.

In the foregoing embodiment, the configuration was used in which the cover portion 12 and the protector main portion 11 are separate members, but there is no limitation to this. For example, it is also possible to use a configuration in which the cover portion 12 and the protector main portion 11 are integrally formed.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A protector comprising:
a protector main portion configured to accommodate a wire harness; and
a guiding portion configured to guide, to an outside, at least part of the wire harness accommodated in the protector main portion,
wherein, in the protector main portion, an outer face of a wall portion of the protector main portion includes a fastener base on which the wire harness guided from the guiding portion can be fastened by a fastener, and
the fastener base has a placement face on which the wire harness is placed, the placement face being a flat face.

2. The protector according to claim 1, wherein the fastener base has a protrusion that is adjacent to the placement face and that projects higher than the placement face.

3. The protector according to claim 2, wherein the protrusion is elongated in a direction that is orthogonal to the projecting direction and that intersects a direction in which the wire harness extends.

4. The protector according to claim 2, wherein the protrusion is arranged on each of the two sides of the placement face in a direction in which the wire harness extends.

5. The protector according to claim 2,
wherein the wire harness includes an electric wire and an outer member that covers an outer side of the electric wire, and
the protrusion is in contact with the outer member.

6. The protector according to claim 5,
wherein the outer member is an accordion-like corrugated tube that covers the outer side of the electric wire and that has a groove and a ridge, and
the protrusion is fitted to and is in contact with the groove of the corrugated tube.

7. The protector according to claim 1,
wherein the protector main portion includes an opening through which the wire harness is accommodated, and further includes a lock portion that fastens a cover portion to the protector main portion, the cover portion being configured to close the opening in a state in which the wire harness is accommodated, and
the fastener base is arranged at a position that is away from the lock portion.

8. A routing unit comprising:
a wire harness configured to be connected to a vibrating portion; and
a protector that accommodates the wire harness,
wherein the protector includes a protector main portion that accommodates the wire harness, and a guiding portion that guides, to an outside, at least part of the wire harness accommodated in the protector main portion,
in the protector main portion, an outer face of a wall portion of the protector main portion includes a fastener base on which the wire harness guided from the guiding portion can be fastened by a fastener, and
the fastener base has a placement face on which the wire harness is placed, the placement face being a flat face.

9. The protector according to claim 1, wherein the fastener base has a surface opposite to the placement face, and the surface of the fastener faces the outer face of a wall portion.

* * * * *